United States Patent
Ikeda et al.

(10) Patent No.: US 8,018,552 B2
(45) Date of Patent: Sep. 13, 2011

(54) TRANSMISSIVE LIQUID CRYSTAL DISPLAY DEVICE

(75) Inventors: Satoru Ikeda, Yokohama (JP); Tetsuya Uesaka, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 82 days.

(21) Appl. No.: 12/602,584

(22) PCT Filed: Jan. 29, 2008

(86) PCT No.: PCT/JP2008/051711
§ 371 (c)(1),
(2), (4) Date: Dec. 1, 2009

(87) PCT Pub. No.: WO2008/152828
PCT Pub. Date: Dec. 18, 2008

(65) Prior Publication Data
US 2010/0182544 A1    Jul. 22, 2010

(30) Foreign Application Priority Data
Jun. 13, 2007   (JP) .................... 2007-156623

(51) Int. Cl.
*G02F 1/1347* (2006.01)
(52) U.S. Cl. ................ 349/75; 349/56; 349/74; 349/76
(58) Field of Classification Search .............. 349/56, 349/74, 75, 76
See application file for complete search history.

(56) References Cited

U.S. PATENT DOCUMENTS

| | | | |
|---|---|---|---|
| 5,460,748 A | 10/1995 | Mazaki et al. | |
| 5,578,243 A | 11/1996 | Mazaki et al. | |
| 5,635,105 A | 6/1997 | Kawata et al. | |
| 5,646,703 A | 7/1997 | Kamada et al. | |
| 6,628,359 B1 | 9/2003 | Terashita et al. | |
| 6,630,973 B1 | 10/2003 | Matsuoka et al. | |

(Continued)

FOREIGN PATENT DOCUMENTS
EP    0926534 A2    6/1999
(Continued)

OTHER PUBLICATIONS

Destrade, C. et al., "Disc-like Mesogens: A Classification," Molecular Crystals and Liquid Crystals, vol. 71, Nos. 1 and 2, pp. 111-135, 1981.

(Continued)

*Primary Examiner* — Jennifer Doan
(74) *Attorney, Agent, or Firm* — Panitch Schwarze Belisario & Nadel LLP

(57) ABSTRACT

The present invention provides a transmissive liquid crystal display device which is less in display characteristics fluctuations, bright in display images, high in contrast and less in viewing angle dependency and comprises a backlight, a polarizer, a second optically anisotropic layer, a first optically anisotropic layer, a homogeneously aligned liquid crystal cell comprising upper and lower substrates facing each other and a liquid crystal layer sandwiched between the upper and lower substrates, and a polarizer, arranged in piles in this order from the backlight, wherein a liquid crystal film forming the first optically anisotropic layer, a liquid crystal film forming the second optically anisotropic layer and the liquid crystal cell have a predetermined relationship in the wavelength dispersion of birefringence, the first optically anisotropic layer, the second optically anisotropic layer and the liquid crystal cell upon application of an electric voltage for black image display, have a predetermined relationship in retardation, and the first optically anisotropic layer comprises a liquid crystal film with a fixed nematic hybrid orientation.

11 Claims, 5 Drawing Sheets

U.S. PATENT DOCUMENTS

| | | | |
|---|---|---|---|
| 6,693,693 | B1 | 2/2004 | Okita et al. |
| 6,903,789 | B1 | 6/2005 | Cutler et al. |
| 6,937,308 | B2 * | 8/2005 | Ishikawa et al. ............. 349/117 |
| 7,719,644 | B2 * | 5/2010 | Fukagawa et al. ............ 349/117 |
| 7,826,017 | B2 | 11/2010 | Uesaka |
| 7,872,716 | B2 | 1/2011 | Nagai |
| 2002/0005925 | A1 | 1/2002 | Arakawa |
| 2002/0130997 | A1 | 9/2002 | Yano et al. |
| 2003/0025862 | A1 | 2/2003 | Yoda |
| 2003/0164921 | A1 | 9/2003 | Uesaka et al. |
| 2003/0169391 | A1 | 9/2003 | Uchida et al. |
| 2004/0119914 | A1 | 6/2004 | Tsuchiya |
| 2004/0257498 | A1 | 12/2004 | Uesaka et al. |
| 2005/0057714 | A1 | 3/2005 | Jeon et al. |
| 2008/0062375 | A1 | 3/2008 | Naka |
| 2008/0192191 | A1 | 8/2008 | Nakamura et al. |
| 2009/0161053 | A1 | 6/2009 | Kaneiwa et al. |
| 2009/0185111 | A1 | 7/2009 | Uesaka et al. |
| 2009/0284689 | A1 | 11/2009 | Ikeda et al. |
| 2010/0085522 | A1 | 4/2010 | Uesaka et al. |

FOREIGN PATENT DOCUMENTS

| | | |
|---|---|---|
| EP | 0 928 984 A2 | 7/1999 |
| EP | 0 646 829 B1 | 7/2002 |
| JP | 06-347742 A | 12/1994 |
| JP | 08-27284 A | 1/1996 |
| JP | 2640083 B2 | 8/1997 |
| JP | 11-194325 A | 7/1999 |
| JP | 11194371 A | 7/1999 |
| JP | 11-352328 A | 12/1999 |
| JP | 2000-111914 A | 4/2000 |
| JP | 2000-235185 A | 8/2000 |
| JP | 2001-004837 A | 1/2001 |
| JP | 2001-166144 A | 6/2001 |
| JP | 2001235747 A | 8/2001 |
| JP | 2002-31717 A | 1/2002 |
| JP | 2003-262869 A | 9/2003 |
| JP | 2004-125830 | 4/2004 |
| JP | 2004-157454 A | 6/2004 |
| JP | 2005-189633 A | 7/2005 |
| JP | 2005-202101 A | 7/2005 |
| JP | 2008064843 A | 3/2008 |
| WO | 2004/031846 A1 | 4/2004 |

OTHER PUBLICATIONS

"The Chemistry of Liquid Crystals," Quarterly Chemistry Survey, No. 22, Chapter 5 and Chapter 10, Section 2, 1994 (edited by Japan Chemical Society).

Kohne, B. et al., "Hexa-O-alkanoyl-scyllo-inosite, die ersten discotischen Fussigkristalle aus alicyclischen, gesattigten Verbindugnen," Angewandte Chemie, vol. 96, pp. 70-71, 1984.

Lehn, J. et al., "Tubular Mesophases: Liquid Crystals consisting of Macrocyclic Molecules," Journal of the Chemical Society, Chemical Communications, No. 24, pp. 1794-1796, 1985.

Zhang, J. et al., "Liquid Crystals Based on Shape-Persistent Macrocyclic Mesogens," Journal of the American Chemical Society, vol. 116, pp. 2655-2656, 1994.

U.S. Office Action issued Feb. 5, 2010 in U.S. Appl. No. 12/094,404.

EP Supplemental Search Report issued Oct. 16, 2009 from the European Patent Office in European Application No. 06 83 2475.

U.S. Office Action issued Dec. 31, 2009 in U.S. Appl. No. 12/278,683.

Notice of Allowance issued on Nov. 19, 2010 from the U.S. Patent Office in U.S. Appl. No. 12/094,295.

Notice of Allowance issued on Jul. 13, 2010 from the U.S. Patent Office in U.S. Appl. No. 12/278,683.

Notice of Allowance issued on Oct. 18, 2010 from the U.S. Patent Office in U.S. Appl. No. 12/094,404.

EP Supplemental Search Report issued on Jun. 28, 2010 in EP Application No. 08 70 4390.

CVI Melles Griot, "XP-002581822 Polarization Tutorial", CVI Laser Optics and Coatings, pp. 202-206, May 5, 2010 retrieved from internet: http://cvimellesgriot.com/Products/Documents/GeneralInfo/PolarizationTutorial.pdf.

P. Van De Witte et al., "Viewing Angle Compensators for Liquid Crystal Displays based on Layers with a Positive Birefringence", Japanese Journal of Applied Physics, vol. 39, Part 1, No. 1, pp. 101-108, Jan. 2000.

Office Action Issued Apr. 6, 2011 in U.S. Appl. No. 12/514,815.

Office Action Issued Feb. 5, 2010 in U.S. Appl. No. 12/094,404.

* cited by examiner

TRANSMISSIVE LIQUID CRYSTAL DISPLAY DEVICE

CROSS-REFERENCE TO RELATED APPLICATION

This application is a section 371 of International Application No. PCT/JP2008/051711, filed Jan. 29, 2008, which was published in the Japanese language on Dec. 18, 2008 under International Publication No. WO 2008/152828 A1 and the disclosure of which is incorporated herein by reference.

FIELD OF THE INVENTION

The present invention relates to transmissive liquid crystal display devices used for office automation (OA) equipment such as word processors and personal computers, mobile information terminals such as personal digital assistants and mobile telephones, or camcorders equipped with a liquid crystal monitor.

BACKGROUND OF THE INVENTION

A liquid crystal display device typically comprises a liquid crystal cell, a polarizer and an optical compensation sheet (retardation plate). A transmissive liquid crystal display device comprises a pair of polarizers, a liquid crystal cell sandwiched therebetween, a single or plurality of optical compensation sheets disposed between the liquid crystal cell and either one or both of the polarizers.

The liquid crystal cell comprises rod-like liquid crystalline molecules, a pair of substrates for enclosing the molecules and electrode layers for applying an electric voltage to the molecules. Examples of the mode of a liquid crystal cell include TN (Twisted Nematic), STN (Super Twisted Nematic), ECB (Electrically Controlled Birefringence), IPS (In-Plane Switching), VA (Vertical Alignment), OCB (Optically Compensated Birefringence), HAN (Hybrid-Aligned Nematic), ASM (Axially Symmetric Aligned Microcell), Half Tone Gray Scale modes, domain divided mode, and display modes using a ferroelectric liquid crystal and an antiferroelectric liquid crystal.

The transmissive liquid crystal display devices can not avoid problems concerning viewing angle such as reduced display contrast, changes in display color and reversed gradation occurring when viewed obliquely because of the refractive index anisotropy of the liquid crystal molecules and thus has been demanded to be improved in these regards.

For a transmissive liquid crystal display device using a TN mode (twisted angle of liquid crystal is 90 degrees), a method for solving these problems has been proposed and practically used wherein optical compensation films are disposed between the liquid crystal cell and each of the upper and lower polarizers.

For example, there are known some structures wherein an optical compensation film composed of hybrid-aligned discotic liquid crystal or nematic hybrid-aligned liquid crystalline polymer is disposed between the liquid crystal cell and each of the upper and lower polarizers (Patent Documents 1 to 3 below).

However, the TN mode can improve the range where contrast widens but is wide in the range where gradation reverses and thus is not necessarily sufficient in viewing angle characteristics. This is because the range where gradation reverses is widened by the molecules in the liquid crystal cell slanting up to the 90 degree direction due to that the liquid crystal layer is twisted at 90 degrees.

For the reasons described above, the mode of a liquid crystal cell is preferably a display mode using an ECB mode wherein the liquid crystal molecules are twisted at an angle of zero degree and homogeneously aligned in the sense of narrowing the range where gradation reverses. An arrangement for improving the viewing angle of the ECB mode is proposed wherein two nematic hybrid-aligned optical compensation films and two uniaxial retardation films are disposed so that each of the compensation films and each of the retardation films are located above and below the homogeneous liquid crystal cell, respectively (Patent Document 4).

However, this method can not solve the problems concerning viewing angle such as reduced display contrast, changes in display color and reversed gradation occurring when the liquid crystal display device is viewed obliquely and has left problems including large fluctuations in displaying characteristics due to the variation in the parameter of each film, the increased total film thickness, and the lower reliability of the device because of the use of four films in total above and below the cell, all of which have been demanded to improve.

(1) Patent Document 1: Japanese Patent Publication No. 2640083
(2) Patent Document 2: Japanese Patent Application Laid-Open Publication No. 11-194325
(3) Patent Document 3: Japanese Patent Application Laid-Open Publication No. 11-194371
(4) Patent Document 4: Japanese Patent Application Laid-Open Publication No. 2005-202101

DISCLOSURE OF THE INVENTION

The present invention intends to solve the above-described problems and provide a transmissive liquid crystal display device that is less in display characteristics fluctuations, bright in display images, high in contrast and less in viewing angle dependency.

According to a first aspect of the present invention, there is provided a transmissive liquid crystal display device comprising at least:

a backlight;
a polarizer;
a second optically anisotropic layer;
a first optically anisotropic layer;
a homogeneously aligned liquid crystal cell comprising upper and lower substrates facing each other and a liquid crystal layer sandwiched between the upper and lower substrates; and
a polarizer, arranged in piles in this order from the backlight, wherein when the ratio of anisotropic refractive indices $\Delta n$ at wavelength $\lambda=450$ nm and $\lambda=590$ nm is defined by wavelength dispersion of birefringence D (D=$\Delta n$ (450)/$\Delta n$ (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

$$D1 > D2$$

$$D1 = 1.00 \text{ to } 1.20$$

$$D2 = 0.80 \text{ to } 1.10$$

$$|(DLC + D1)/2 - D2| < 0.5, \text{ and}$$

when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1−Ny1)×d1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2−Ny2)×d2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows

|Re1+Re(LC)−Re2|<30 nm

Re1=20 to 140 nm

Re2=50 to 180 nm, the first optically anisotropic layer comprises at least a liquid crystal film with a fixed nematic hybrid orientation.

According to a second aspect of the present invention, there is provided a transmissive liquid crystal display device comprising at least:
  a backlight;
  a polarizer;
  a homogeneously aligned liquid crystal cell comprising upper and lower substrates facing each other and a liquid crystal layer sandwiched between the upper and lower substrates;
  a first optically anisotropic layer;
  a second optically anisotropic layer; and
  a polarizer, arranged in piles in this order from the backlight, wherein
when the ratio of anisotropic refractive indices Δn at wavelength λ=450 nm and λ=590 nm is defined by wavelength dispersion of birefringence D (D=Δn (450)/Δn (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

|(DLC+D1)/2−D2|<0.5, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1−Ny1)×d1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2−Ny2)×d2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows

|Re1+Re(LC)−Re2|<30 nm

Re1=20 to 140 nm

Re2=50 to 180 nm, the first optically anisotropic layer comprises at least a liquid crystal film with a fixed nematic hybrid orientation.

According to a third aspect of the present invention, there is provided a transmissive liquid crystal display device comprising at least:
  a backlight;
  a polarizer;
  a first optically anisotropic layer;
  a homogeneously aligned liquid crystal cell comprising upper and lower substrates facing each other and a liquid crystal layer sandwiched between the upper and lower substrates;
  a second optically anisotropic layer; and
  a polarizer, arranged in piles in this order from the backlight, wherein
when the ratio of anisotropic refractive indices Δn at wavelength λ=450 nm and λ=590 nm is defined by wavelength dispersion of birefringence D (D=Δn (450)/Δn (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

|(DLC+D1)/2−D2|<0.5, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1−Ny1)×d1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2−Ny2)×d2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows

|Re1+Re(LC)−Re2|<30 nm

Re1=20 to 140 nm

Re2=50 to 180 nm, the first optically anisotropic layer comprises at least a liquid crystal film with a fixed nematic hybrid orientation.

According to a fourth aspect of the present invention, there is provided a transmissive liquid crystal display device comprising at least:
  a backlight;
  a polarizer;

a second optically anisotropic layer;

a homogeneously aligned liquid crystal cell comprising upper and lower substrates facing each other and a liquid crystal layer sandwiched between the upper and lower substrates;

a first optically anisotropic layer; and a polarizer, arranged in piles in this order from the backlight, wherein when the ratio of anisotropic refractive indices Δn at wavelength λ=450 nm and λ=590 nm is defined by wavelength dispersion of birefringence D (D=Δn (450)/Δn (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

|(DLC+D1)/2−D2|<0.5, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1−Ny1)×d1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2−Ny2)×d2 [nm], the retardation Re1 of the first optically anisotropic layer, the retardation Re2 of the second optically anisotropic layer and the retardation Re (LC) of the liquid crystal cell upon application of an electric voltage for black image display, each at a wavelength of 550 nm are within the ranges defined as follows

|Re1+Re(LC)−Re2|<30 nm

Re1=20 to 140 nm

Re2=50 to 180 nm, the first optically anisotropic layer comprises at least a liquid crystal film with a fixed nematic hybrid orientation.

According to a fifth aspect of the present invention, there is provided the transmissive liquid crystal display device according to any one of the first to fourth aspects, wherein the second optically anisotropic layer is a polymeric stretched film.

According to a sixth aspect of the present invention, there is provided the transmissive liquid crystal display device according to any one of the first to fourth aspects, wherein the second optically anisotropic layer is an optical film produced by fixing a liquid crystalline substance exhibiting an optically positive uniaxiality to be in a nematic orientation formed while the substance is in a liquid crystal state.

According to a seventh aspect of the present invention, there is provided the transmissive liquid crystal display device according to anyone of the first to sixth aspects, wherein the angle formed by the tilt direction which is the projection of the hybrid direction of the liquid crystal film forming the first optically anisotropic layer to a substrate plane and the rubbing direction of the liquid crystal layer is within the range of 30 degrees or smaller.

According to an eighth aspect of the present invention, there is provided the transmissive liquid crystal display device according to any one of the first to seventh aspects, wherein the angle formed by the tilt direction which is the projection of the hybrid direction of the liquid crystal film forming the first optically anisotropic layer to a substrate plane and the slow axis of the second optically anisotropic layer is within the range of 70 degrees or greater and smaller than 110 degrees.

According to a ninth aspect of the present invention, there is provided the transmissive liquid crystal display device according to any one of the first to eighth aspects, wherein the liquid crystal film forming the first optically anisotropic layer is a liquid crystal film produced by fixing a liquid crystalline substance exhibiting an optically positive uniaxiality in a nematic hybrid orientation formed from while the substance is in a liquid crystal state, and the average tilt angle in the nematic hybrid orientation is from 5 to 45 degrees.

According to a tenth aspect of the present invention, there is provided the transmissive liquid crystal display device according to any one of the first to ninth aspects, wherein the angle formed by the absorption axis of the polarizer and the tilt direction which is the projection of the hybrid direction of the liquid crystal film forming the first optically anisotropic layer to a substrate plane is within the range of 30 degrees or greater and 60 degrees or smaller.

According to an eleventh aspect of the present invention, there is provided the transmissive liquid crystal display device according to any one of the first to tenth aspects, wherein the retardation of the homogeneously aligned liquid crystal cell is from 200 to 400 nm when no electric voltage is applied.

[Effects of the Invention]

The transmissive liquid crystal display device of the present invention has characteristics that it is bright in display images, high in contrast and less in viewing angle dependency.

BEST MODE FOR CARRYING OUT THE INVENTION

Figure 1:
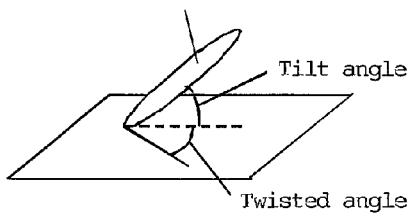
FIG. 1 is a conceptual view for describing the tilt and twisted angles of a liquid crystal molecule.

The present invention will be described in more detail below.

The transmissive liquid crystal display device of the present invention has a configuration selected from the following four patterns (1) to (4) and if necessary may contain additional components such as a light diffusing layer, a light control film, a light guide plate and a prism sheet, on which no particular restriction is imposed. Any of the configuration patterns (1) to (4) may be used in order to obtain optical characteristics with less viewing angle dependency.

(1) polarizer/liquid crystal cell/first optically anisotropic layer/second optically anisotropic layer/polarizer/backlight (2) polarizer/second optically anisotropic layer/first optically anisotropic layer/liquid crystal cell/polarizer/backlight (3) polarizer/second optically anisotropic layer/liquid crystal cell/first optically anisotropic layer/polarizer/backlight (4) polarizer/first optically anisotropic layer/liquid crystal cell/second optically anisotropic layer/polarizer/backlight Constitution elements used in the present invention will be described in turn.

First of all, the liquid crystal cell used in the present invention will be described.

The mode of the liquid crystal cell used in the present invention is a homogeneously aligned cell mode. The homogeneously aligned cell used herein is a cell with a twisted angle of substantially zero degree. The term "substantially zero degree" refers to an angle of zero degree or greater and 5 degrees or smaller. The retardation (and) of the liquid crystal cell is preferably from 200 to 400 nm when no electric voltage is applied, more preferably from 230 to 350 nm. A retardation deviating from these ranges is not preferable because undesired coloration or reduced brightness would be invited.

There is no particular restriction on the driving mode of the liquid crystal cell, which may, therefore, be a passive matrix mode used in an STN-LCD, an active matrix mode using active electrodes such as TFT (Thin Film Transistor) electrodes and TFD (Thin Film Diode) electrodes, and a plasma address mode.

The liquid crystal cell is composed of a liquid crystal layer sandwiched between two transparent substrates disposed to face each other (the viewer's side substrate may be referred to as "upper substrate" and the backlight side's substrate may be referred to as "lower substrate").

There is no particular restriction on the material forming the liquid crystal layer. Examples of the material include various low molecular weight liquid crystalline substances, polymeric liquid crystalline substances, and mixtures thereof, which can constitute various liquid crystal cells. The liquid crystalline material may be blended with dyes, chiral dopants, or non-liquid crystalline substances to an extent that they do not prevent the liquid crystal substance from exhibiting liquid crystallinity. The liquid crystal cell may be provided with various components required for the above-described various liquid crystal cell modes or various components described below.

There is no particular restriction on the transparent substrates forming the liquid crystal cell as long as they can align a liquid crystalline material forming a liquid crystal layer in a specific alignment direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode may be provided between the alignment layer and the substrate.

There is no particular limitation on the polarizer used in the present invention as long as the objects of the present invention can be achieved. Therefore, the polarizer may be any conventional ones that are generally used in liquid crystal display devices. Specific examples include PVA-based polarizing films such as polyvinyl alcohol (PVA) and partial acetalized PVA, polarizing films such as those produced by stretching a hydrophilic polymeric film comprising a partially saponified product of an ethylene-vinyl acetate copolymer and absorbing iodine and/or dichroic dye, and those comprising a polyene-oriented film such as a dechlorinated product of polyvinyl chloride. Alternatively, there may be used reflection type polarizers.

These polarizers may be used alone or in combination with a transparent protection layer provided on one or both of the surfaces of the polarizer for the purpose of enhancing the strength, moisture resistance, and heat resistance thereof. Examples of the protection layer include those formed by laminating a transparent plastic film such as polyester, triacetyl cellulose or a cyclic olefin polymer directly or via an adhesive layer on the polarizer; coated layers of transparent resin; and acrylic- or epoxy-based photo-setting type resin layers. When the protection layers are coated on the both surfaces of the polarizing film, they may be the same or different from one another.

With regard to the second optically anisotropic layer used in the present invention, there is no particular restriction thereon as long as it is excellent in transparency and uniformity. However, the layer is preferably a polymeric stretched film or an optical film formed from a liquid crystalline material. Examples of the polymeric stretched film include uniaxial or biaxial retardation films formed from cellulose-, polycarbonate-, polyarylate-, polysulfone-, polyacryl-, polyethersulfone-, or cyclic olefin-based polymers. The second optically anisotropic layers exemplified herein may be composed of a polymeric stretched film or an optical film formed from a liquid crystalline material alone or the combination thereof. Examples of the optical film formed from a liquid crystalline material include those comprised of various liquid crystalline polymeric compounds of main chain- and/or side chain-types, such as liquid crystalline polyesters, liquid crystalline polycarbonates, liquid crystalline polyacrylates, or low molecular weight liquid crystalline compounds having reactivities which can be polymerized by cross-linking or the like after being aligned. These films may be a single-layered film with self-supportivity or formed over a transparent supporting substrate.

When the x and y directions are taken in the plane direction and the thickness direction is defined as z direction, a positive uniaxial optically anisotropic layer has a relation of refractive index defined by nx>ny=nz. A positive biaxial optically anisotropic layer has a relation of refractive index defined by nx>nz>ny. A negative uniaxial optically anisotropic layer has a relation of refractive index defined by nx=ny>nz. A negative biaxial optically anisotropic layer has a relation of refractive index defined by nx>ny>nz.

The first optically anisotropic layer used in the present invention is a layer comprising at least a liquid crystal film produced by fixing a liquid crystalline polymer exhibiting an optically positive uniaxiality, more specifically a polymeric liquid crystalline compound exhibiting an optically positive uniaxiality or a polymeric liquid crystal composition containing at least one type selected from the polymeric liquid crystalline compounds and exhibiting an optically positive uniaxiality, in a nematic hybrid alignment with an average tilt angle of 5 to 45 degrees, formed when the liquid crystalline polymeric compound or composition is in a liquid crystal state.

The term "nematic hybrid alignment" used herein refers to an alignment structure wherein the liquid crystal molecules are aligned in a nematic alignment wherein the angles of the directors of the liquid crystalline molecules relative to the film upper surface and the lower film surface are different from each other. Therefore, since the angles formed by the directors and the film planes are different between in the vicinities of the upper and lower interfaces of the film, the nematic hybrid alignment can be referred to as an alignment wherein the angles vary continuously between the upper and lower film surfaces.

In a liquid crystal film with a fixed nematic hybrid alignment structure, the directors of the liquid crystalline molecules are directed at different angles in all the positions in the film thickness direction. Therefore, optical axis no longer exists when the film is viewed as the whole film structure.

The term "average tilt angle" used herein refers to an average value of the angles defined between the directors of the liquid crystalline molecules and a film plane, in the thickness direction of the liquid crystal film. In the liquid crystal film used in the present invention, the absolute value of the angle formed by a director in the vicinity of one of the film surfaces and the film surface is generally from 20 to 90 degrees, preferably from 40 to 80 degrees, more preferably from 50 to 70 degrees while the absolute value of the angle formed by the director and the other film surface is generally from 0 to 20 degrees, preferably from 0 to 10 degrees. The absolute value of the average tilt angle is generally from 5 to 50 degrees, preferably 20 to 45 degrees, more preferably 25 to 45 degrees.

The average tilt angle, if deviating from the above ranges, would cause the contrast of the resulting liquid crystal display device to decrease when the device is viewed from an oblique direction. The average tilt angle can be determined by applying a crystal rotation method.

The liquid crystal film forming the first optically anisotropic layer used in the present invention comprises a liquid crystalline polymeric compound or a liquid crystalline polymeric composition as described above with a fixed nematic hybrid alignment and a specific average tilt angle but may be formed from any liquid crystalline material as long as the material can be aligned in a nematic hybrid alignment and satisfies the requirement concerning the specific average tilt angle, as described above. For example, the film may be a liquid crystal film produced by allowing a low molecular weight liquid crystalline material to be in a liquid crystal state, and then aligning the material in a nematic hybrid alignment and fixing the aligned alignment by photo- or thermal-cross-linking. The term "liquid crystal film" used herein refers to those produced by forming a liquid crystalline substance such as a low molecular weight or polymeric liquid crystalline substance into a film, regardless of whether or not the liquid crystal film itself exhibits liquid crystallinity.

With regard to an apparent retardation value in the plane of a liquid crystal film forming the first optically anisotropic layer when viewed from the normal direction thereof, the refractive index ($n_e$) in the direction parallel to directors is different from the refractive index ($n_o$) in the direction perpendicular to directors, in a liquid crystal film with a fixed nematic hybrid alignment structure and, therefore, assuming that the value obtained by subtracting $n_o$ from $n_e$ (ne−no) be an apparent birefringence, an apparent retardation value is given as the product of the apparent birefringence and the absolute film thickness. This retardation value is easily obtained by a polarization optical measurement such as ellipsometry.

The specific conditions for the arrangement of the optically anisotropic layers in the liquid crystal display device of the present invention will be described in more details. In order to describe the specific arrangement conditions, the upper and lower planes and tilt direction of the optically anisotropic layer formed of a liquid crystal film and the pre-tilt direction of the liquid crystal cell are defined as follows using the annexed FIGS. 1 to 3.

When the upper and lower planes of the optically anisotropic layer formed of the liquid crystal film are defined by the angles formed by the directors of the liquid crystalline molecules in the vicinity of the film interfaces and the film planes, the plane forming an angle of 20 to 90 degrees at the acute angle side with the director is defined as "b-plane", while the plane forming an angle of 0 to 20 degrees at the acute angle side with the director is defined as "c-plane".

Figure 2:
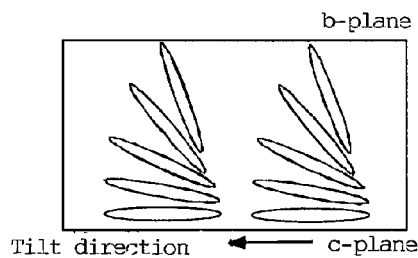
FIG. 2 is a conceptual view for describing the aligned structure of the liquid crystal film forming the second optically anisotropic layer.
Figure 3:
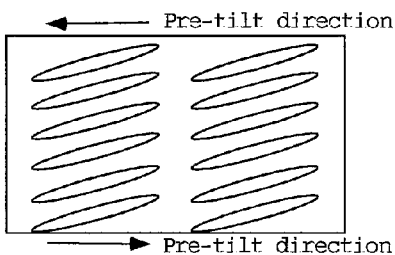
FIG. 3 is a conceptual view for describing the pre-tilt direction of the liquid crystal cell.

When c-plane is viewed from b-plane through the optically anisotropic layer, the direction in which the angles between the directors of the liquid crystal molecules and the projection thereof to the c-plane are acute and which is parallel to the projection is defined as "tilt direction" (see FIGS. 1 and 2).

Next, on the cell interface of the liquid crystal cell, the low molecular weight liquid crystal for driving the liquid crystal cell is not generally parallel to the cell interface and tilted at a certain angle, which angle is generally referred to as "pre-tilt angle". However, a direction along which the director of a liquid crystalline molecule on the cell interface and the projection thereof form an acute angle and which is parallel to the projection is herein defined as "pre-tilt direction of the liquid crystal cell" (see FIG. 3).

The first and second optically anisotropic layers may be attached to one another via an adhesive or tacky adhesive layer.

There is no particular restriction on adhesives for forming the adhesive layer as long as they have enough adhesivity to the optically anisotropic layers and do not harm the optical characteristics thereof. Examples of the adhesives include acrylic resin-, methacrylic resin-, epoxy resin-, ethylene-vinyl acetate copolymer-, rubber-, urethane-, polyvinylether-based adhesives, and mixtures thereof and various reactive adhesives such as of thermal curing and/or photo curing types, and electron radiation curing types. The adhesive may be an adhesive having a function of a transparent protection layer for protecting the optically anisotropic layers.

There is no particular restriction on tacky adhesives for forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferred to use a tacky adhesive such as an acrylic tacky adhesive which is excellent in optical transparency, weather resistance and heat resistance and readily adjustable in wettability, cohesivity and adhesivity.

The adhesive layer or tacky adhesive layer (hereinafter may be collectively referred to as "tacky/adhesive layer") may be formed by any suitable method. Examples of the method include a method wherein a base polymer or a composition thereof is dissolved or dispersed in a solvent containing toluene or ethyl acetate alone or in combination thereby preparing a tacky/adhesive solution containing 10 to 40 percent by mass of the adhesive, which solution is then directly laid over the above-described optically anisotropic layer by an appropriate developing method such as casting or coating or a method wherein a tacky/adhesive layer is formed in accordance with the method as described above on a separator and then transferred onto the optically anisotropic layers. The tacky/adhesive layer may contain additives such as natural or synthetic resins, in particular fillers or pigments containing tackiness-imparting resins, glass fibers, glass beads, metal powders, and other inorganic powders, dyes, and anti-oxidants. The tacky/adhesive layer may contain fine particles so as to exhibit light diffusivity.

When the optically anisotropic layers are attached to one another via a tacky/adhesive layer, they may be subjected to a surface treatment so as to improve their adhesivity to the tacky/adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

Next, explanation will be given of the configurations of the liquid crystal display devices comprising the above-described component members, according to the present invention.

The configurations of the liquid crystal display devices of the present invention are necessarily selected from the following four patterns (1) to (4) as shown in FIGS. 4, 8, 11, and 14:

(1) polarizer/liquid crystal cell/first optically anisotropic layer/second optically anisotropic layer/polarizer/backlight;

(2) polarizer/second optically anisotropic layer/first optically anisotropic layer/liquid crystal cell/polarizer/backlight;

(3) polarizer/second optically anisotropic layer/liquid crystal cell/polarizer/first optically anisotropic layer/backlight; and (4) polarizer/first optically anisotropic layer/liquid crystal cell/second optically anisotropic layer/polarizer/backlight.

Now, taking the above configuration (1) for example, the display principle of a liquid crystal display according to an embodiment of the present invention will be described with reference to FIG. 4.

On a substrate 1 is arranged a transparent electrode 3 formed from a highly transmissive material such as ITO while on a substrate 2 is arranged a counter electrode 4 formed from a highly transmissive material such as ITO. A liquid crystal layer 5 formed from a liquid crystalline material exhibiting a positive dielectric anisotropy is sandwiched between the transparent electrode 3 and the counter electrode 4. A polarizer 7 is arranged on the side of the substrate 2, opposite to the side on which the counter electrode 4 is formed while a first optically anisotropic layer 9, a second optically anisotropic layer 10 and a polarizer 8 are arranged on the side of the substrate 1, opposite to the side on which the transparent electrode 3 is formed. A backlight 11 is arranged in the rear side of the polarizer 8, as viewed from the viewer.

The angle formed by the pre-tilt direction of the liquid crystal layer in the liquid crystal cell and the tilt direction of the first optically anisotropic layer formed of a liquid crystal film wherein a nematic hybrid alignment is fixed is preferably from 0 to 30 degrees, more preferably 0 to 20 degrees, particularly preferably from 0 to 10 degrees. The angle if larger than 30 degrees would fail to attain a sufficient viewing angle compensation effect.

The angle formed by the slow axis of the second optically anisotropic layer and the tilt direction of the first optically anisotropic layer is preferably 70 degrees or larger and smaller than 110 degrees, more preferably 80 degrees or larger and smaller than 100 degrees. The angle if 110 degrees or larger or smaller than 70 degrees would cause a reduction in front contrast.

The angle formed by the tilt direction of the first optically anisotropic layer and the absorption axis of the polarizer is preferably 30 degrees or larger and smaller than 60 degrees, more preferably 40 degrees or larger and smaller than 50 degrees. The angle if 60 degrees or larger or smaller than 30 degrees would cause a reduction in front contrast.

The angle formed by the slow axis of the second optically anisotropic layer and the absorption axis of the polarizer is preferably 30 degrees or larger and smaller than 60 degrees, more preferably 40 degrees or larger and smaller than 50 degrees. The angle if 60 degrees or larger or smaller than 30 degrees would cause a reduction in front contrast.

The anisotropic refractive indices of the liquid crystal material used in the above-mentioned liquid crystal cell, first optically anisotropic layer and second optically anisotropic layer defined as $\Delta nLC$, $\Delta n1$ and $\Delta n2$, respectively have generally dependency upon wavelength $\lambda$ (nm) and have characteristics that they have generally negative trends with respect to wavelength $\lambda$. The ratio of anisotropic refractive indices at wavelength $\lambda=450$ nm and $\lambda=590$ nm (hereinafter designated as "$\Delta n$ (450)" and "$\Delta n$ (590)", respectively) is defined by wavelength dispersion of birefringence D that is $$D=\Delta n\ (450)/\Delta n\ (590).$$

D is the same if liquid crystal materials are identical but may also be the same even if liquid crystal materials are not identical. The wavelength dispersions of birefringence of the liquid crystal cell, first optically anisotropic layer and second optically anisotropic layer are designated as DLC, D1 and D2, respectively.

The light illuminated from the backlight 11 is made incident to the second optically anisotropic layer 10 through the polarizer 8. In the above-described configuration, the slow axis of the first optically anisotropic layer 9 is substantially in parallel to the rubbing direction of the liquid crystal cell 6, and the slow axis of the second optically anisotropic layer 10 is substantially perpendicular to the slow axis of the first optically anisotropic layer 9 and the rubbing direction of the liquid crystal cell 6.

Now when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1−Ny1)×d1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2−Ny2)×d2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are adjusted to meet the following relationships:

$$|Re1+Re(LC)-Re2|<30 \text{ nm} \quad (1)$$

$$Re1=20 \text{ to } 140 \text{ nm} \quad (2)$$

$$Re2=50 \text{ to } 180 \text{ nm} \quad (3).$$

Whereupon, the optical anisotropy of the second optically anisotropic layer is cancelled out by the optical anisotropies of the first optically anisotropic layer and liquid crystal cell. As the result, a black display image can be obtained because the light passing through the polarizer 8 is made incident to the polarizer 7 substantially without being affected by retardation. Re1, Re2 and Re (LC) deviating the range defined by formula (1) above are not preferable because the front contrast would be reduced. If Re1 deviates the range defined by formula (2) above, sufficient viewing angle improving effect may not be obtained or unnecessary coloration may occur when the display device is viewed obliquely. If Re2 deviates the range defined by formula (3) above, a sufficient compensation effect may not be obtained.

In order to obtain an excellent black display image, the wavelength dispersion of birefringence D2 of the second optically anisotropic layer, the wavelength dispersion of birefringence D1 of the first optically anisotropic layer, and the wavelength dispersion of birefringence DLC of the liquid crystal cell are preferably adjusted to meet the following relationships:

$$D1>D2 \quad (4)$$

$$D1=1.00 \text{ to } 1.20 \quad (5)$$

$$D2=0.80 \text{ to } 1.10 \quad (6)$$

$$|(DLC+D1)/2|-D2|<0.5 \quad (7).$$

Adjusting the dispersions of each of the optically anisotropic layers and the liquid crystal cell allows a visible light in a wide range of wavelength to satisfy formula (1) above and the optical anisotropies of the second optically anisotropic layer, first optically anisotropic layer and liquid crystal cell to be cancelled out. As the result, an excellent black image can be obtained. If the dispersions of each of the optically anisotropic layers and the liquid crystal cell deviate the above-defined ranges, contrast would be reduced or unnecessary coloration would occur on the display.

Since there is no particular restriction on the light diffusing layer, light control film, light guide plate or prism sheet, any conventional ones may be used.

In addition to the above-described components, the liquid crystal display device of the present invention may be provided with other additional components. For example, the use of a color filter makes it possible to produce a color liquid crystal display device which can provide multi- or full-colored display images with increased color purity.

EXAMPLES

The present invention will be further described in the following examples, but the present invention should not be construed as being limited thereto. The retardations (Δnd) in the examples are values at a wavelength of 550 nm, unless stated otherwise.

(1) Measurement of Film Thickness

Measurement of film thickness was carried out using SURFACE TEXTURE ANALYSIS SYSTEM Dektak 3030ST manufactured by SLOAN Co. A method was also used in which the film thickness was determined by interference measurement ("Ultraviolet Visible Near-Infrared Spectrophotometer V-570" available from JASCO Corporation) and refractive index data.

(2) Parameter Measurement of Liquid Crystal Film

The measurement was carried out using an automatic birefringence analyzer KOBRA21ADH manufactured by Oji Scientific Instruments.

Example 1

The configuration and axis arrangement of the liquid crystal display device of Example 1 will be described with reference to FIGS. 4 and 5, respectively.

On a substrate 1 is arranged a transparent electrode 3 formed from a highly transmissive material such as ITO while on a substrate 2 is arranged a counter electrode 4 formed from a highly transmissive material such as ITO. A liquid crystal layer 5 formed from a liquid crystalline material exhibiting a positive dielectric anisotropy is sandwiched between the transparent electrode 3 and the counter electrode 4. A polarizer 7 is arranged on the side of the substrate 2, opposite to the side on which the counter electrode 4 is formed while a first optically anisotropic layer 9, a second optically anisotropic layer 10 and a polarizer 8 are arranged on the side of the substrate 1, opposite to the side on which the transparent electrode 3 is formed. A backlight 11 is arranged in the rear side of the polarizer 8, as viewed from the viewer.

In accordance with the disclosures of Japanese Patent Application Laid-Open Publication No. 6-347742, various first optically anisotropic layers 9 (Δnd: 10 to 160 nm) were prepared which layers are formed of liquid crystal films with various thicknesses in a fixed nematic hybrid alignment wherein the average tilt angle in the film thickness direction is 28 degrees. A liquid crystal display device was produced so as to have an axis arrangement as shown in FIG. 5.

The liquid crystal cell 6 used in this example was produced using ZLI-1695 manufactured by Merck Ltd as a liquid crystalline material so that the liquid crystal layer thickness was 4.9 μm. The pre-tilt angle at both of the cell interfaces was 3 degrees. The and of the liquid crystal cell was approximately 320 nm while the dispersion DLC was approximately 1.03.

Figure 4:
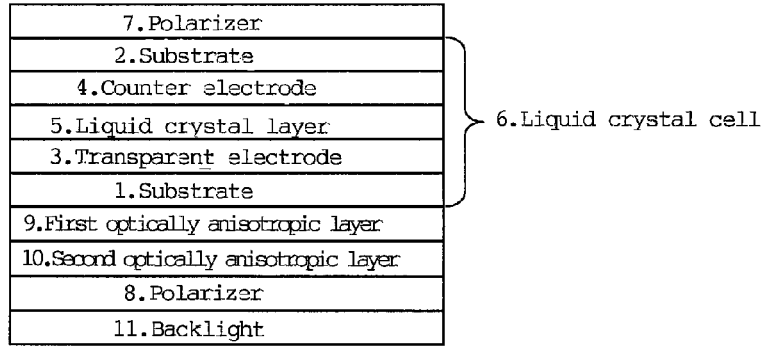
FIG. 4 is a schematic cross-sectional view of the liquid crystal display device of Example 1.

The polarizer 7 (thickness: about 100 μm, SQW-062 manufactured by Sumitomo Chemical Industry Co., Ltd.) was arranged on the viewer's side of the liquid crystal cell 6 (upper side of FIG. 4).

On the rear side of the liquid crystal cell 6 as viewed from the viewer were arranged a liquid crystal film 9 as the first optically anisotropic layer 9, a polymeric stretched film 10 formed of a uniaxially stretched ZEONOR film (tradename, manufactured by ZEON CORPORATION) as the second optically anisotropic layer 10, on the rear side of which the polarizer 8 was arranged.

The dispersion of the ZEONOR film was approximately 1.02 while the dispersion of the first optically anisotropic layer was approximately 1.16.

Figure 5:
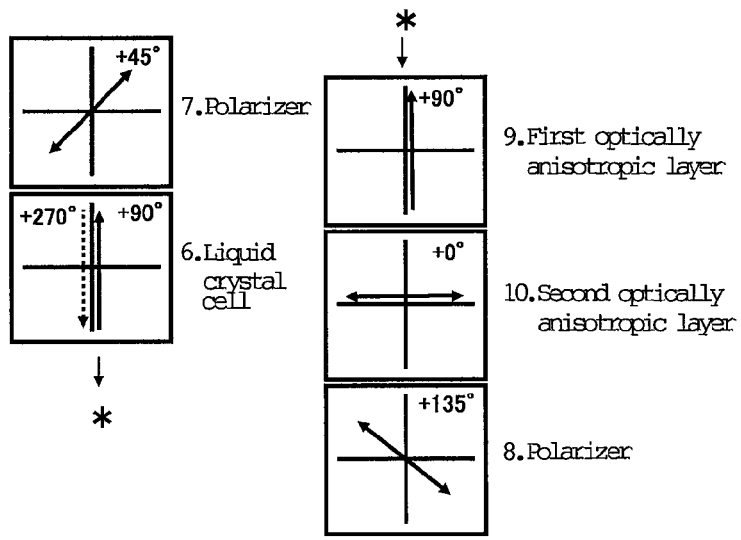
FIG. 5 is a plan view indicating the angular relation of the absorption axes of the polarizers, the pre-tilt direction of the liquid crystal cell, the slow axis of the polymeric stretched film and the tilt direction of the liquid crystal film in Example 1.

The absorption axes of the polarizers 7, 8, the pre-tilt direction of the cell 6 at both of the interfaces, the tilt direction of the liquid crystal film 9 and the slow axis of the polymeric stretched film 10 were oriented as shown in FIG. 5.

Figure 6:
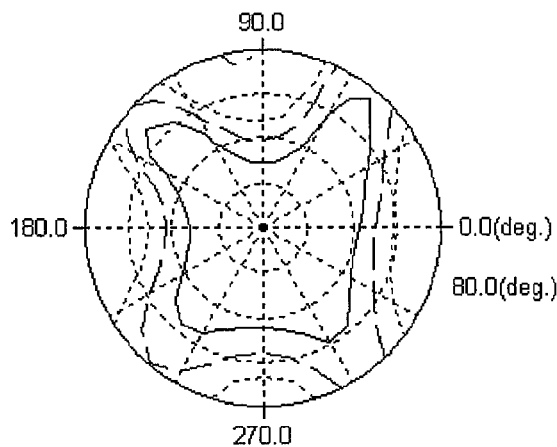
FIG. 6 is a view indicating the contrast ratio when viewing the liquid crystal display device of Example 1 from all the directions.

FIG. 6 shows the contrast ratio (CR) from all the directions defined by the transmissivity ratio of white image 0 V and black image 5 V "(white image)/(black image)" when the backlight is on (transmission mode) and the Δnds of the first optically anisotropic layer 9 and ZEONOR film were 90 nm and 140 nm, respectively.

It was confirmed from FIG. 6 that the liquid crystal display device had excellent viewing angle characteristics. The concentric circles are drawn to be at an interval of 20 degrees. Therefore, the outermost circle indicates 80 degrees from the center (the same is applied to the subsequent drawings).

The same measurement was carried out for cases wherein the retardation of the first optically anisotropic layer is varied, using the configuration of Example 1. The resulting CR and viewing characteristics are summarized in Table 1 below.

Figure 7:
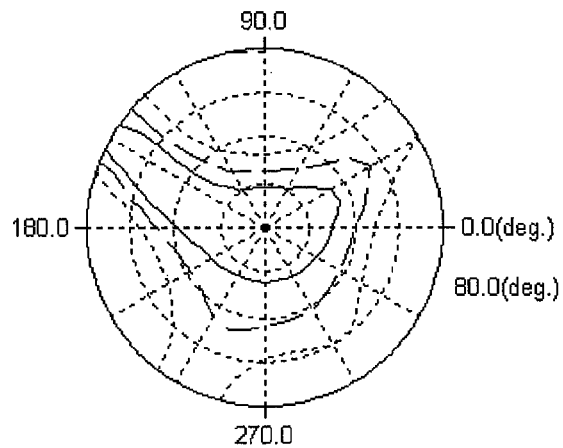
FIG. 7 is a view indicating the contrast ratio when viewing the liquid crystal display device of a comparative example from all the directions.

As a comparative example, FIG. 7 shows the contrast ratio from all the directions defined by the transmissivity ratio of white image 0 V and black image 5 V "(white image)/(black image)" when the backlight is on (transmission mode) and the Δnds of the first optically anisotropic layer and ZEONOR film were 10 nm and 60 nm, respectively, which are outside the ranges defined by the present invention.

From the results set forth in Table 1 and the comparative example, the front CR is improved but the viewing angle becomes narrower gradually as the Δnd of the first optically anisotropic layer is decreased, and thus a Δnd of less than 20 nm is not preferable because a sufficient viewing angle can not be obtained.

Further, the too large Δnd of the first optically anisotropic layer is also not preferable because a sufficient front CR can not be obtained. Therefore, it was found that the end of the first optically anisotropic layer is desirously adjusted within the range of 20 nm to 140 nm.

substrate 1 opposite to the side on which the transparent electrode 3 was formed. A backlight 11 was arranged in the rear of the polarizer 8.

The polarizers 7, 8, first optically anisotropic layer 9, and second optically anisotropic layer 10 were the same as those used in Example 1.

Figure 8:
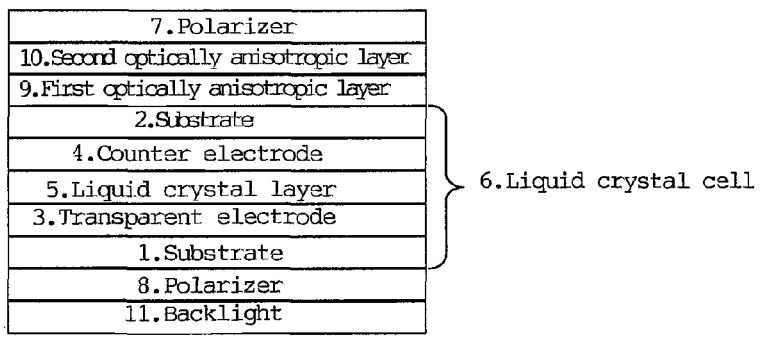
FIG. 8 is a schematic cross-sectional view of the liquid crystal display device of Example 2.

The absorption axes of the polarizers 7, 8, the pre-tilt direction of the cell 6 at both of the interfaces, the tilt direction of the liquid crystal film 9 and the slow axes of the polymeric stretched film 10 were oriented as shown in FIG. 8.

Figure 10:
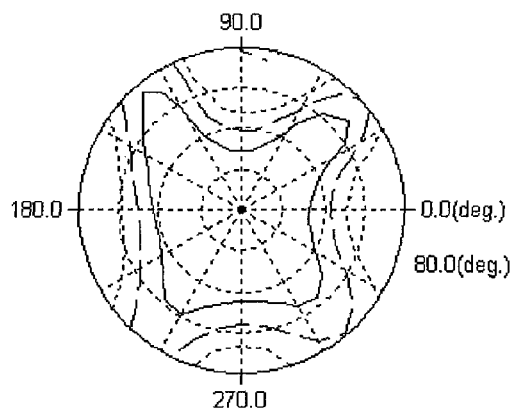
FIG. 10 is a view indicating the contrast ratio when viewing the liquid crystal display device of Example 2 from all the directions.

FIG. 10 shows the contrast ratio from all the directions defined by the transmissivity ratio of white image 0 V and black image 5 V "(white image)/(black image)".

It was confirmed from FIG. 10 that the liquid crystal display device had excellent viewing angle characteristics.

Example 3

Figure 11:
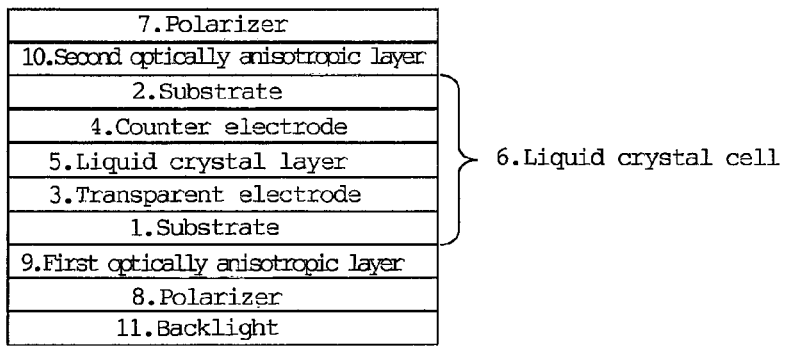
FIG. 11 is a schematic cross-sectional view of the liquid crystal display device of Example 3.
Figure 12:
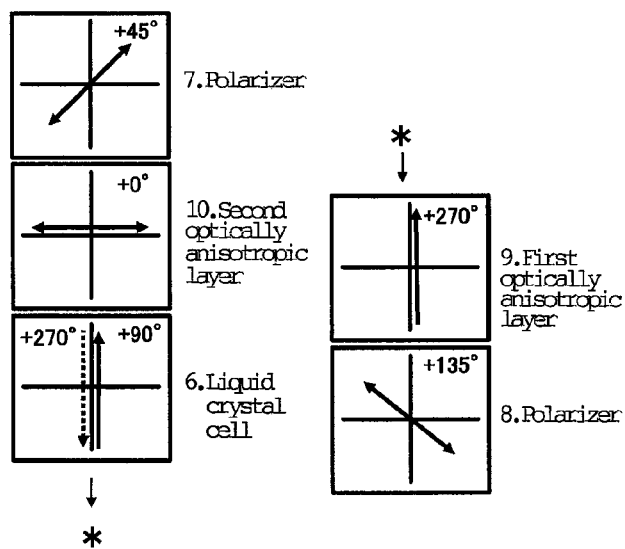
FIG. 12 is a plan view indicating the angular relation of the absorption axes of the polarizers, the pre-tilt direction of the liquid crystal cell, the slow axis of the polymeric stretched film and the tilt direction of the liquid crystal film in Example 3.

The configuration and axis arrangement of the liquid crystal display device of Example 3 will be described with reference to FIGS. 11 and 12, respectively.

The liquid crystal cell 6 of Example 1 was used. On the side of the substrate 2 opposite to the side on which the counter electrode 4 was formed were arranged a second optically anisotropic layer 10 and a polarizer 7. On the side of the substrate 1 opposite to the side on which the transparent electrode 3 was formed were arranged a first optically anisotropic layer 9 and a polarizer 8. A backlight 11 was arranged in the rear of the polarizer 8.

Figure 13:
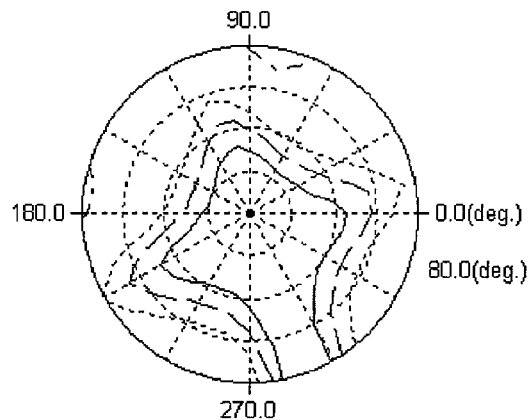
FIG. 13 is a view indicating the contrast ratio when viewing the liquid crystal display device of Example 3 from all the directions.

FIG. 13 shows the contrast ratio from all the directions defined by the transmissivity ratio of white image 0 V and black image 5 V "(white image)/(black image)".

It was confirmed from FIG. 13 that the liquid crystal display device had excellent viewing angle characteristics.

Example 4

Figure 14:
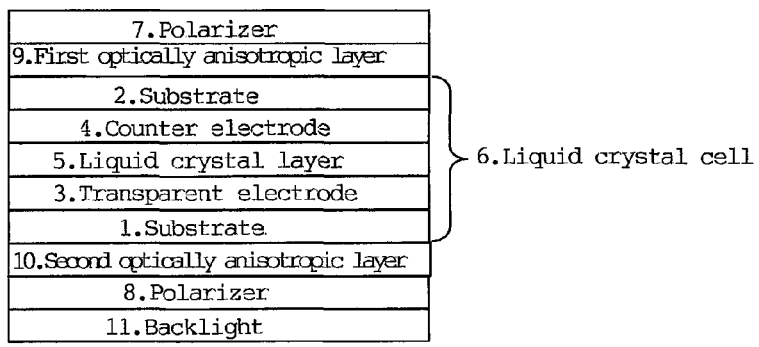
FIG. 14 is a schematic cross-sectional view of the liquid crystal display device of Example 4.
Figure 15:
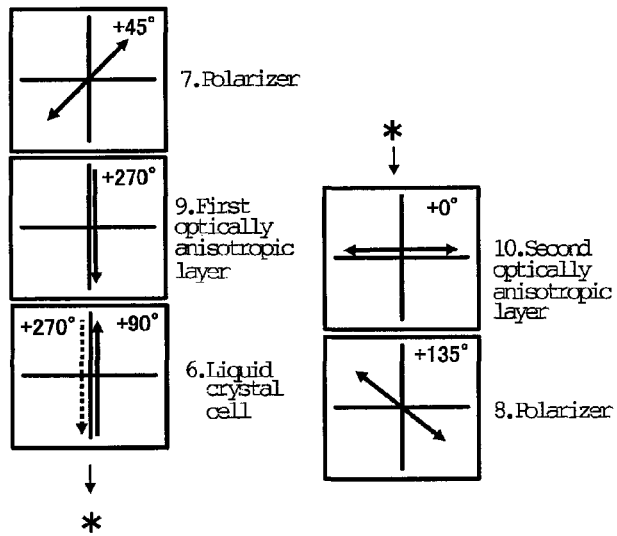
FIG. 15 is a plan view indicating the angular relation of the absorption axes of the polarizers, the pre-tilt direction of the liquid crystal cell, the slow axis of the polymeric stretched film and the tilt direction of the liquid crystal film in Example 4.

The configuration and axis arrangement of the liquid crystal display device of Example 4 will be described with reference to FIGS. 14 and 15, respectively.

The liquid crystal display device of this example was prepared with the same procedures of Example 3 except that the positions of the second optically anisotropic layer 10 and the first optically anisotropic layer 9 were switched.

Figure 16:
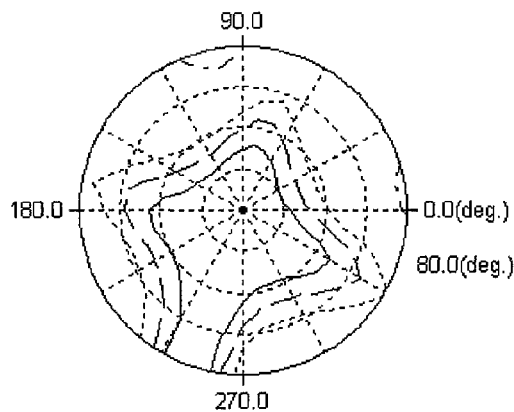
FIG. 16 is a view indicating the contrast ratio when viewing the liquid crystal display device of Example 4 from all the directions.

FIG. 16 shows the contrast ratio from all the directions defined by the transmissivity ratio of white image 0 V and black image 5 V "(white image)/(black image)".

TABLE 1

|  | Retardation of First Optically Anisotropic Layer | | | | | | | |
| --- | --- | --- | --- | --- | --- | --- | --- | --- |
|  | 10 nm | 30 nm | 50 nm | 70 nm | 90 nm | 110 nm | 130 nm | 150 nm |
| Front CR | 679 | 670 | 646 | 619 | 579 | 544 | 495 | 452 |
| Viewing Angle | Poor | Good | Excellent | Excellent | Excellent | Excellent | Excellent | Good |

Example 2

Figure 9:
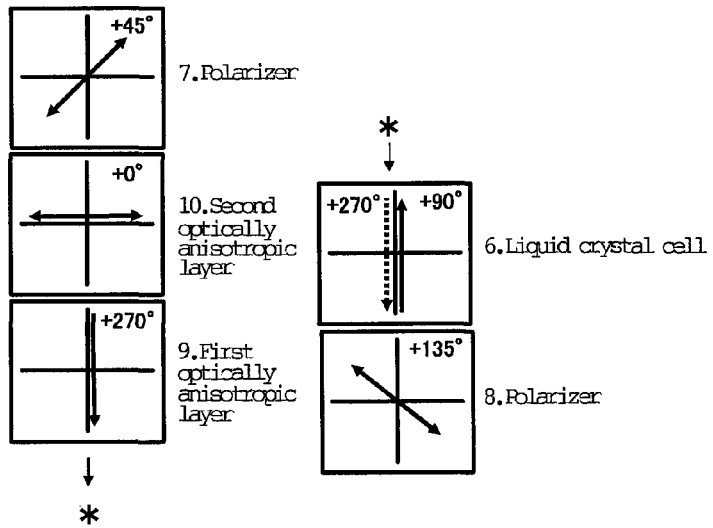
FIG. 9 is a plan view indicating the angular relation of the absorption axes of the polarizers, the pre-tilt direction of the liquid crystal cell, the slow axis of the polymeric stretched film and the tilt direction of the liquid crystal film in Example 2.

The configuration and axis arrangement of the liquid crystal display device of Example 2 will be described with reference to FIGS. 8 and 9, respectively.

The liquid crystal cell 6 of Example 1 was used. On the side of the substrate 2 opposite to the side on which the counter electrode 4 was formed were arranged a first optically anisotropic layer 9, a second optically anisotropic layer 10 and a polarizer 7. A polarizer 8 was arranged on the side of the It was confirmed from FIG. 16 that the liquid crystal display device had excellent viewing angle characteristics.

In these examples, the experiments were carried out without using a color filter. Of course, the provision of a color filter in the liquid crystal cell can provide excellent multi-color or full-color images.

The invention claimed is:

1. A transmissive liquid crystal display device comprising at least:
   a backlight;

a polarizer;
a second optically anisotropic layer;
a first optically anisotropic layer;
a homogeneously aligned liquid crystal cell comprising upper and lower substrates facing each other and a liquid crystal layer sandwiched between the upper and lower substrates; and
a polarizer, arranged in piles in this order from the backlight, wherein when the ratio of anisotropic refractive indices $\Delta n$ at wavelength $\lambda=450$ nm and $\lambda=590$ nm is defined by wavelength dispersion of birefringence D (D=$\Delta n$ (450)/$\Delta n$ (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

$|(DLC+D1)/2-D2|<0.5$, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1-Ny1)xd1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2-Ny2)xd2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows $|Re1+Re\ (LC)-Re2|<30$ nm Re1=20 to 140 nm Re2=50 to 180 nm, the first optically anisotropic layer comprises at least a liquid crystal film with a fixed nematic hybrid orientation.

2. A transmissive liquid crystal display device comprising at least:
a backlight;
a polarizer;
a homogeneously aligned liquid crystal cell comprising upper and lower substrates facing each other and a liquid crystal layer sandwiched between the upper and lower substrates;
a first optically anisotropic layer;
a second optically anisotropic layer; and
a polarizer, arranged in piles in this order from the backlight, wherein when the ratio of anisotropic refractive indices $\Delta n$ at wavelength $\lambda=450$ nm and $\lambda=590$ nm is defined by wavelength dispersion of birefringence D (D=$\Delta n$ (450)/$\Delta n$ (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

$|(DLC+D1)/2-D2|<0.5$, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1-Ny1)xd1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2-Ny2)xd2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows $|Re1+Re\ (LC)-Re2|<30$ nm Re1=20 to 140 nm Re2=50 to 180 nm, the first optically anisotropic layer comprises at least a liquid crystal film with a fixed nematic hybrid orientation.

3. A transmissive liquid crystal display device comprising at least:
a backlight;
a polarizer;
a first optically anisotropic layer;
a homogeneously aligned liquid crystal cell comprising upper and lower substrates facing each other and a liquid crystal layer sandwiched between the upper and lower substrates;
a second optically anisotropic layer; and
a polarizer, arranged in piles in this order from the backlight, wherein when the ratio of anisotropic refractive indices $\Delta n$ at wavelength $\lambda=450$ nm and $\lambda=590$ nm is defined by wavelength dispersion of birefringence D (D=$\Delta n$ (450)/$\Delta n$ (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

$|(DLC+D1)/2-D2|<0.5$, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1-

Ny1)xd1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2-Ny2)xd2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows

|Re1+Re (LC)–Re2|<30 nm

Re1=20 to 140 nm

Re2=50 to 180 nm, the first optically anisotropic layer comprises at least a liquid crystal film with a fixed nematic hybrid orientation.

4. A transmissive liquid crystal display device comprising at least:
- a backlight;
- a polarizer;
- a second optically anisotropic layer;
- a homogeneously aligned liquid crystal cell comprising upper and lower substrates facing each other and a liquid crystal layer sandwiched between the upper and lower substrates;
- a first optically anisotropic layer; and
- a polarizer, arranged in piles in this order from the backlight, wherein when the ratio of anisotropic refractive indices Δn at wavelength λ=450 nm and λ=590 nm is defined by wavelength dispersion of birefringence D (D=Δn (450)/Δn (590)), the wavelength dispersion of birefringence D1 of a liquid crystal film forming the first optically anisotropic layer, the wavelength dispersion of birefringence D2 of a liquid crystal film forming the second optically anisotropic layer and the wavelength dispersion of birefringence DLC of the liquid crystal cell are within the ranges defined as follows:

D1>D2

D1=1.00 to 1.20

D2=0.80 to 1.10

|(DLC+D1)/2−D2|<0.5, and when the thickness of the first optically anisotropic layer is d1, the principal indices of plane direction refraction of the first layer are Nx1 and Ny1, the principal index of thickness direction refraction of the first layer is Nz1 and the retardation in the plane of the first layer Re1 is defined as Re1=(Nx1-Ny1)xd1 [nm], and the thickness of the second optically anisotropic layer is d2, the principal indices of plane direction refraction of the second layer are Nx2 and Ny2, the principal index of thickness direction refraction of the second layer is Nz2 and the retardation in the plane of the second layer Re2 is defined as Re2=(Nx2-Ny2)xd2 [nm], the retardation Re1 of the first optically anisotropic layer, the retardation Re2 of the second optically anisotropic layer and the retardation Re(LC) of the liquid crystal cell upon application of an electric voltage for black image display, each at a wavelength of 550 nm are within the ranges defined as follows

|Re1+Re (LC)–Re2|<30 nm

Re1=20 to 140 nm

Re2=50 to 180 nm, the first optically anisotropic layer comprises at least a liquid crystal film with a fixed nematic hybrid orientation.

5. The transmissive liquid crystal display device according to claim 1, wherein the second optically anisotropic layer is a polymeric stretched film.

6. The transmissive liquid crystal display device according to claim 1, wherein the second optically anisotropic layer is an optical film produced by fixing a liquid crystalline substance exhibiting an optically positive uniaxiality to be in a nematic orientation formed while the substance is in a liquid crystal state.

7. The transmissive liquid crystal display device according to claim 1, wherein the angle formed by the tilt direction which is the projection of the hybrid direction of the liquid crystal film forming the first optically anisotropic layer to a substrate plane and the rubbing direction of the liquid crystal layer is within the range of 30 degrees or smaller.

8. The transmissive liquid crystal display device according to claim 1, wherein the angle formed by the tilt direction which is the projection of the hybrid direction of the liquid crystal film forming the first optically anisotropic layer to a substrate plane and the slow axis of the second optically anisotropic layer is within the range of 70 degrees or greater and smaller than 110 degrees.

9. The transmissive liquid crystal display device according to claim 1, wherein the liquid crystal film forming the first optically anisotropic layer is a liquid crystal film produced by fixing a liquid crystalline substance exhibiting an optically positive uniaxiality in a nematic hybrid orientation formed from while the substance is in a liquid crystal state, and the average tilt angle in the nematic hybrid orientation is from 5 to 45 degrees.

10. The transmissive liquid crystal display device according to claim 1, wherein the angle formed by the absorption axis of the polarizer and the tilt direction which is the projection of the hybrid direction of the liquid crystal film forming the first optically anisotropic layer to a substrate plane is within the range of 30 degrees or greater and 60 degrees or smaller.

11. The transmissive liquid crystal display device according to claim 1, wherein the retardation of the homogeneously aligned liquid crystal cell is from 200 to 400 nm when no electric voltage is applied.

* * * * *